United States Patent
Kimura

(10) Patent No.: US 8,654,212 B2
(45) Date of Patent: Feb. 18, 2014

(54) AUDIO SIGNAL PROCESSING APPARATUS

(75) Inventor: Masafumi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 163 days.

(21) Appl. No.: 13/406,757

(22) Filed: Feb. 28, 2012

(65) Prior Publication Data

US 2012/0242891 A1 Sep. 27, 2012

(30) Foreign Application Priority Data

Mar. 23, 2011 (JP) ................................ 2011-064825

(51) Int. Cl.
*H04N 5/76* (2006.01)
*G03B 17/24* (2006.01)
*H04B 15/00* (2006.01)

(52) U.S. Cl.
USPC ........................ 348/231.4; 396/312; 381/94.1

(58) Field of Classification Search
USPC .......... 348/231.4; 396/312; 381/71.11, 71.14, 381/73.1, 94.1
See application file for complete search history.

(56) References Cited

U.S. PATENT DOCUMENTS

| 8,379,110 B2 * | 2/2013 | Masuda ..................... 348/231.4 |
| 8,432,480 B2 * | 4/2013 | Abe et al. ...................... 348/363 |
| 8,514,300 B2 * | 8/2013 | Sonoda ....................... 348/231.4 |
| 2004/0032509 A1 * | 2/2004 | Owens et al. .............. 348/222.1 |
| 2008/0309786 A1 * | 12/2008 | Archibald et al. ......... 348/222.1 |
| 2011/0022403 A1 * | 1/2011 | Washisu et al. ............... 704/503 |
| 2011/0176032 A1 * | 7/2011 | Kajimura .................. 348/231.4 |
| 2011/0234848 A1 * | 9/2011 | Matsumoto et al. ....... 348/231.4 |
| 2011/0254979 A1 * | 10/2011 | Okazaki ..................... 348/231.4 |
| 2011/0305351 A1 * | 12/2011 | Kimura ........................ 381/94.1 |
| 2012/0026345 A1 * | 2/2012 | Osako et al. ............. 348/207.99 |
| 2012/0133784 A1 * | 5/2012 | Kajimura ................. 348/207.99 |
| 2012/0140103 A1 * | 6/2012 | Kimura ........................ 348/335 |
| 2012/0162471 A1 * | 6/2012 | Sekiya et al. ............. 348/231.4 |
| 2012/0212635 A1 * | 8/2012 | Abe et al. .................... 348/221.1 |
| 2012/0300100 A1 * | 11/2012 | Okazaki et al. ............ 348/231.4 |
| 2013/0088632 A1 * | 4/2013 | Korekuni et al. ............. 348/335 |
| 2013/0141598 A1 * | 6/2013 | Kajimura et al. ........ 348/207.99 |
| 2013/0141599 A1 * | 6/2013 | Kimura et al. ........... 348/207.99 |
| 2013/0230189 A1 * | 9/2013 | Kimura ........................ 381/94.1 |
| 2013/0230307 A1 * | 9/2013 | Kimura ........................ 396/312 |

FOREIGN PATENT DOCUMENTS

| JP | 04233873 A | * | 8/1992 |
| JP | 2006-203376 | | 8/2006 |
| JP | 2007251656 A | * | 9/2007 |
| JP | 2008178062 A | * | 7/2008 |
| JP | 2009260603 A | * | 11/2009 |
| JP | 2011077604 A | * | 4/2011 |
| JP | 2012009978 A | * | 1/2012 |

* cited by examiner

*Primary Examiner* — John Villecco

(74) *Attorney, Agent, or Firm* — Cowan, Liebowitz & Latman, P.C.

(57) ABSTRACT

The controller controls the audio processor to perform the first reduction process, in a case where the type of the connected removable lens unit is a first type lens unit, the controller controls the audio processor to perform the second reduction process, in a case where the type of the connected removable lens unit is a second type lens unit.

10 Claims, 11 Drawing Sheets

F I G. 4A
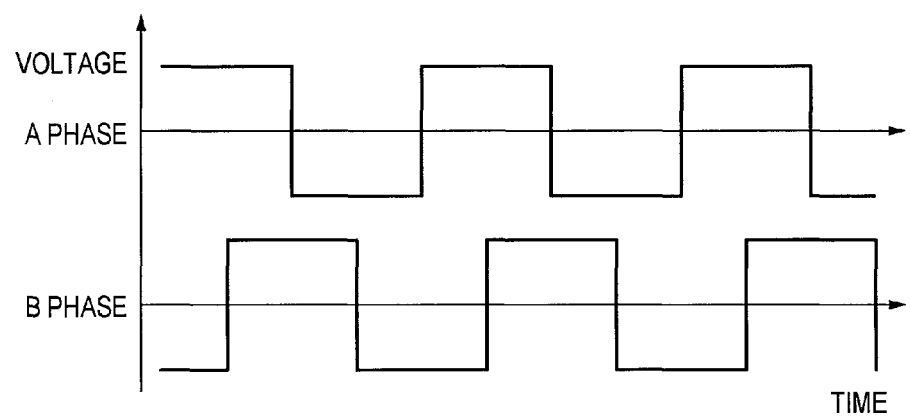
F I G. 4B
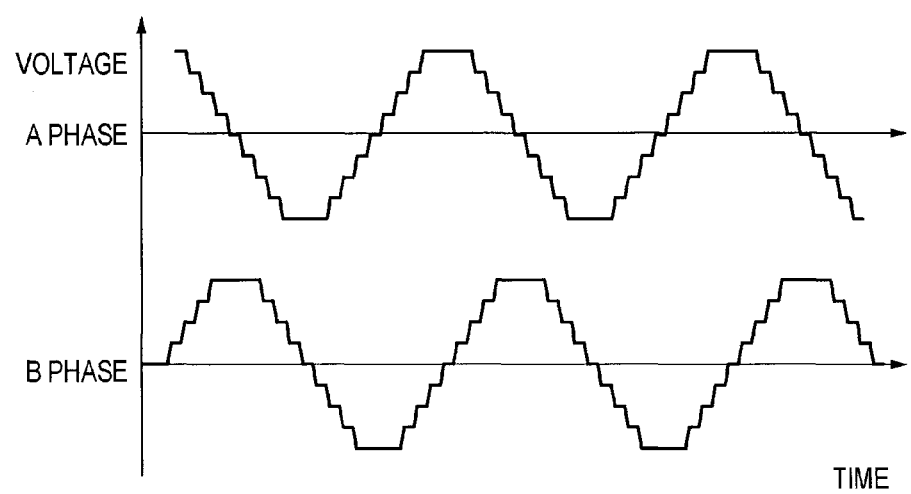

MECHANICAL DRIVING NOISE GENERATION SECTION

MECHANICAL DRIVING NOISE GENERATION SECTION

AUDIO SIGNAL PROCESSING APPARATUS

BACKGROUND OF THE INVENTION

1. Field of the Invention

The present invention relates to an audio signal processing apparatus.

2. Description of the Related Art

Conventionally, as an audio signal processing apparatus, image pickup apparatuses such as cameras, which can pick up moving images, are known. Each of these image pickup apparatuses drives driven units such as, for example, a lens, diaphragm, and the like, which units are incorporated in itself, so as to pick up a moving image. Driving noise generated at that time is mixed in an audio signal, and an audio signal which is not required by the user may be unwantedly recorded. To solve this problem, various proposals have been conventionally made.

In Japanese Patent Laid-Open No. 2006-203376, a digital camera switches noise processing methods according to an operation time period of a motor used to adjust an optical system. Thus, noise processing is executed according to the motor operation time period, thereby obtaining a high-quality audio signal. More specifically, when the motor operation time period is long, the digital camera reduces noise using a low-pass filter; when the motor operation time period is short, it executes processing for superimposing an audio signal immediately before the motor operation on that during a noise generation period.

Japanese Patent Laid-Open No. 2006-203376 considers the motor operation time period, but it does not consider types of noise generation sources. That is, the digital camera simply switches types of noise processes according to the length of the operation time period irrespective of types of noise generation sources. Therefore, flexibility associated with switching of the noise processes is limited.

SUMMARY OF THE INVENTION

The present invention has been made in consideration of the above situation, and provides a technique for selecting processes for reducing noise included in an audio signal based on types of components which generate noise when they operate, as well as the length of an operation period.

According to an aspect of the present invention, there is provided an audio signal processing apparatus comprising: a connection unit that connects with a removable lens unit; a microphone unit that acquires audio signal; an audio processor that processes the audio signal acquired by the microphone unit so as to reduce a driving noise of the removable lens unit; and a controller, wherein the audio processor performs a first reduction process and a second reduction process, wherein the audio processor, in the first reduction process, reduces the driving noise by using a signal which is generated based on an audio signal of previous or subsequent to a noise section of the driving noise, wherein the audio processor, in the second reduction process, reduces the driving noise by attenuating a part of the driving noise, wherein the controller detects a type of the connected removable lens unit, wherein the controller controls the audio processor to perform the first reduction process, in a case where the type of the connected removable lens unit is a first type lens unit, and wherein the controller controls the audio processor to perform the second reduction process, in a case where the type of the connected removable lens unit is a second type lens unit.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 4A and 4B are charts for explaining excitation methods of a stepping motor;

DESCRIPTION OF THE EMBODIMENTS

Various exemplary embodiments, features, and aspects of the invention will be described in detail below with reference to the drawings.

It should be noted that the technical scope of the present invention is defined by claims, and is not limited by each embodiment described below. In addition, not all combinations of the features described in the embodiments are necessarily required for realizing the present invention.

The following embodiments will explain an image pickup apparatus, which can pick up a moving image, as an example of an apparatus to which an audio signal processing apparatus of the present invention is applicable. However, a moving image pickup operation is not indispensable, and the audio signal processing apparatus of the present invention is also applicable to, for example, a voice recorder which can collect surrounding audio signals. Furthermore, the audio signal processing apparatus of the present invention is applicable to, for example, a personal computer (PC) which processes audio signals acquired by the image pickup apparatus, voice recorder, or the like.

The following embodiments will exemplify an optical system driving unit and capacitor as components, which generate noise when they operate. However, types of components are not limited to them, and for example, the components may include a hard disk drive. The audio signal processing apparatus of the present invention can control operations of these components.

First Embodiment

Figure 1:
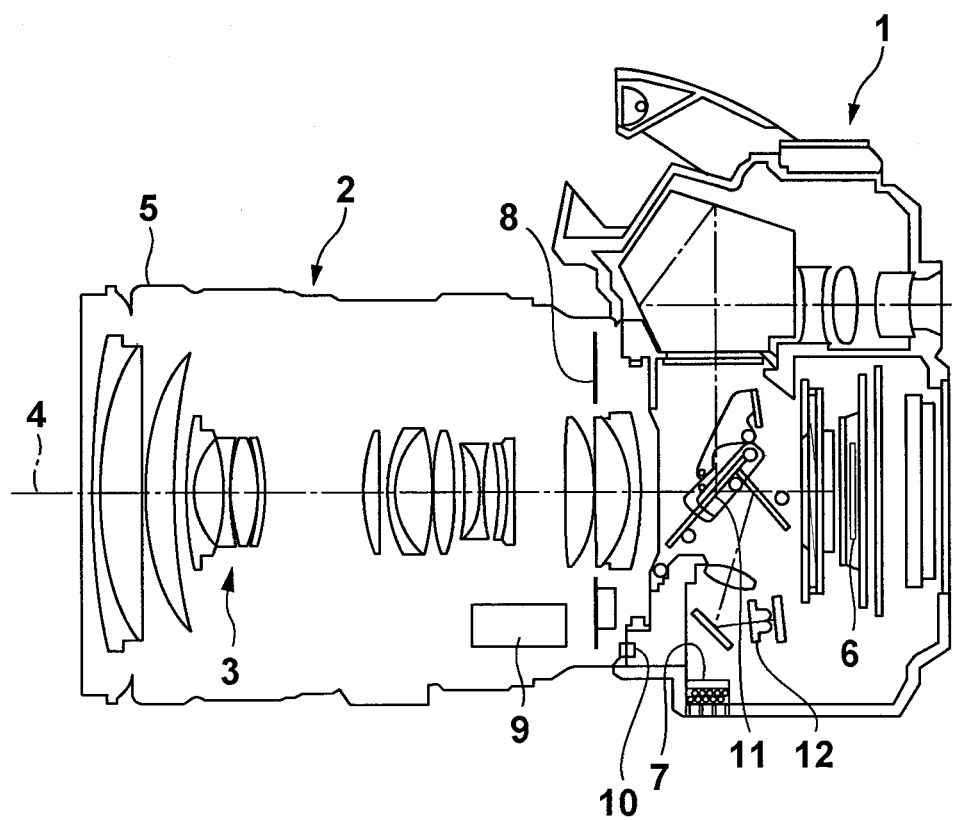
FIG. 1 is a sectional view showing an image pickup apparatus 1 according to the first embodiment, and an imaging lens 2 connected to it.

FIG. 1 is a sectional view of an image pickup apparatus 1 according to the first embodiment, and an imaging lens 2 connected to it. Note that the imaging lens 2 may be either detachable from the image pickup apparatus 1 or integrated with the image pickup apparatus 1. In FIG. 1, reference numeral 3 denotes an photographing optical system; 4, an optical axis of the imaging lens 2; 5, a lens barrel; 6, an image pickup element; 7, a microphone provided to the image pickup apparatus 1; 8, a board required to execute lens control; and 9, an optical system driving unit required to adjust the photographing optical system 3. Reference numeral 10 denotes contacts used to connect the image pickup apparatus 1 and imaging lens 2; 11, a so-called quick return mirror; and 12, a focus/exposure detection unit which includes AE/AF sensors.

The image pickup apparatus 1 adjusts the photographing optical system 3 by executing focus/exposure detection using the imaging lens 2 and focus/exposure detection unit 12, and driving some lenses of the photographing optical system 3, thereby operating the diaphragm to form an optical image in the vicinity of the image pickup element 6 and to obtain an appropriate exposure value. Detailed operations will be described later using the block diagram shown in FIG. 2. The image pickup apparatus 1 obtains information of an object from the image pickup element 6 in synchronism with an operation of a release button (not shown) by the user, and records the information in a recording medium such as a memory card.

Figure 2:
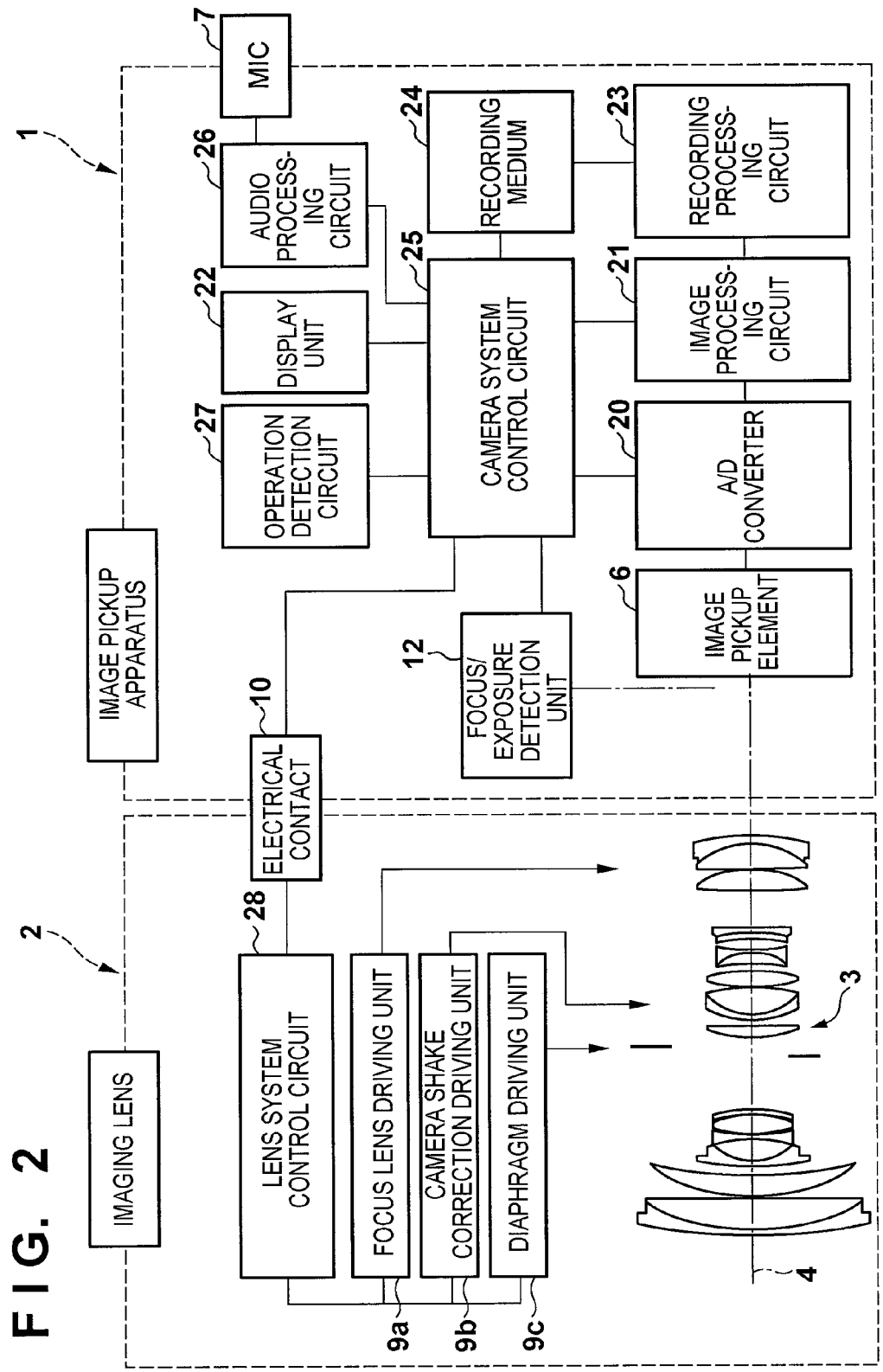
FIG. 2 is a block diagram showing the electrical arrangements of the image pickup apparatus 1 and imaging lens 2.

FIG. 2 is a block diagram showing the electrical arrangements of the image pickup apparatus 1 and imaging lens 2. The image pickup apparatus 1 has an image pickup system, image processing system, audio processing system, recording/reproduction system, and control system. The image pickup system includes the imaging lens 2 and image pickup element 6. The image processing system includes an A/D converter 20 and image processing circuit 21. The audio processing system includes the microphone 7 and an audio processing circuit 26. The recording/reproduction system includes a recording processing circuit 23 and recording medium 24. The control system includes a camera system control circuit 25, the focus/exposure detection unit 12, an operation detection circuit 27, a lens system control circuit 28, and the optical system driving unit 9. The optical system driving unit 9 includes a focusing lens driving unit 9a, camera shake correction driving unit 9b, diaphragm driving unit 9c, and the like.

The image pickup system is an optical processing system which forms light coming from an object on an imaging plane of the image pickup element 6 via the imaging lens 2. During an image pickup preliminary operation such as aiming, some rays of a light beam are guided to the focus/exposure detection unit 12 via a mirror included in the quick return mirror 11. When the imaging lens 2 is appropriately adjusted by the control system, as will be described later, the image pickup element 6 can be exposed by object light of an appropriate light amount, and an object image is formed in the vicinity of the image pickup element 6.

The image processing circuit 21 is a signal processing circuit which processes image signals of pixels of the image pickup element, which signals are received from the image pickup element 6 via the A/D converter 20, and includes a white balance circuit, gamma correction circuit, interpolation calculation circuit which attains resolution enhancement by interpolation calculations, and the like.

In the audio processing system, the audio processing circuit 26 applies appropriate processing to a signal obtained by the microphone 7, thus generating an audio signal to be recorded. The audio signal to be recorded undergoes compression processing by the recording processing circuit 23 (to be described below) to be linked with an image.

The recording processing circuit 23 outputs an image signal to the recording medium 24, and generates and saves an image to be output to a display unit 22. The recording processing circuit 23 compresses an image, moving image, audio, and the like using predetermined methods.

The camera system control circuit 25 generates and outputs timing signals at a time of image pickup and the like. The focus/exposure detection unit 12 detects a focus state of the image pickup apparatus 1 and a luminance level of an object. The lens system control circuit 28 adjusts the optical system by appropriately driving the imaging lens 2 in accordance with a signal from the camera system control circuit 25.

The control system controls the image pickup system, image processing system, and recording/reproduction system in accordance with external operations. For example, when the operation detection circuit 27 detects pressing of a shutter release button (not shown), the control system controls the driving operation of the image pickup element 6, the operation of the image processing circuit 21, the compression processing of the recording processing circuit 23, and the like. The control system controls states of respective segments of an information display apparatus so as to display information on an optical viewfinder, liquid crystal monitor, and the like by the display unit 22.

The adjustment operation of the optical system by the control system will be described below. The focus/exposure detection unit 12 is connected to the camera system control circuit 25, which calculates an appropriate focus position and diaphragm position based on signals from the focus/exposure detection unit 12. The camera system control circuit 25 instructs the lens system control circuit 28 of these positions via the electric contacts 10, and the lens system control circuit 28 appropriately controls the focusing lens driving unit 9a and diaphragm driving unit 9c. Furthermore, a camera shake detection sensor (not shown) is connected to the lens system control circuit 28. In a camera shake correction mode, the lens system control circuit 28 appropriately controls the camera shake correction driving unit 9b based on a signal from the camera shake detection sensor.

The relationship between the driving methods of the diaphragm driving unit 9c and the selection methods of noise processes, and that between sound generated by an object (to be referred to as object sound hereinafter) and unnecessary noise generated by the diaphragm driving unit 9c (to be referred to as mechanical driving noise hereinafter) will be described below using FIG. 3 to FIGS. 6A and 6B. Note that this selection of the noise processes is executed during execution of a moving image pickup operation.

Figure 3:
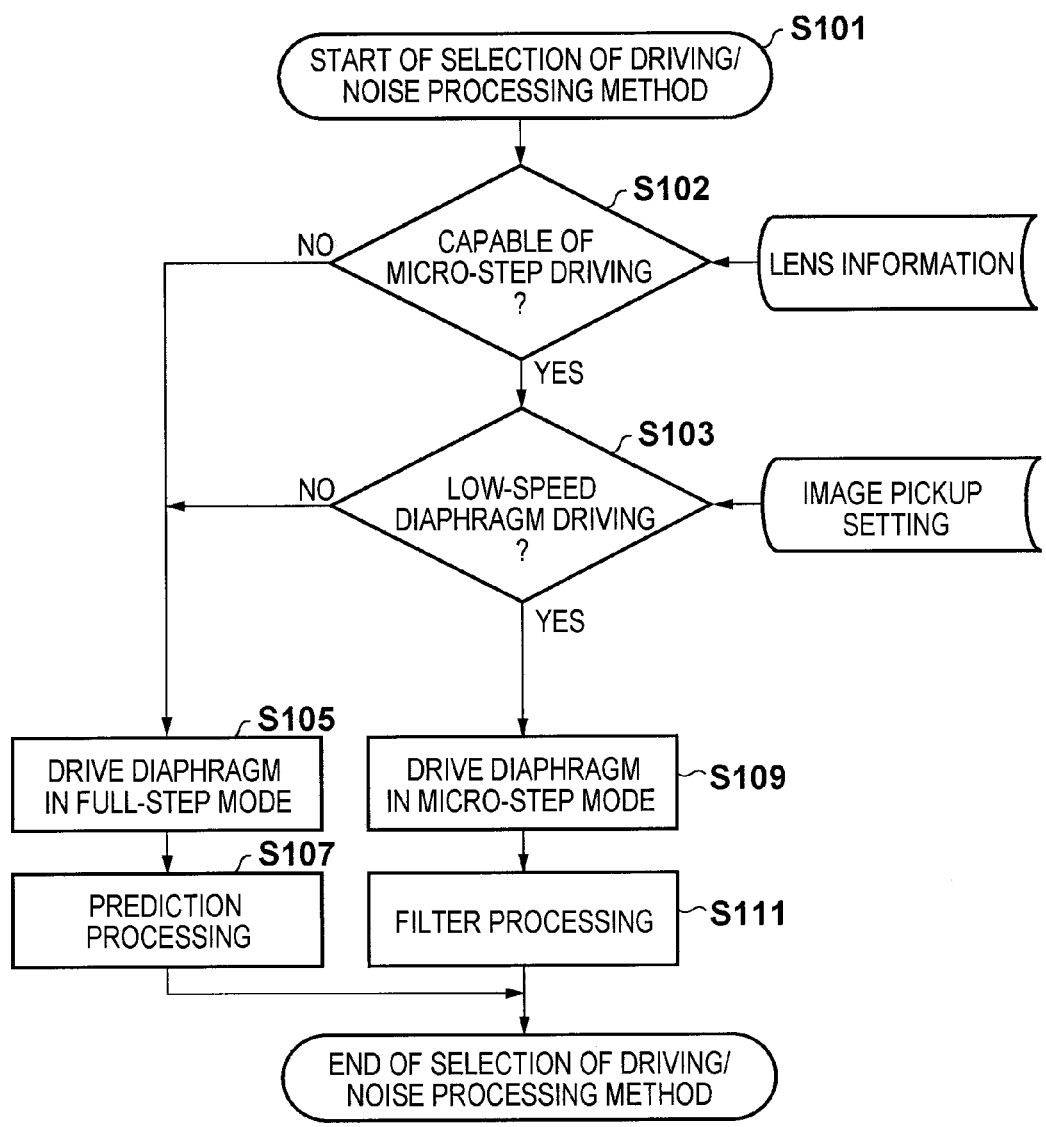
FIG. 3 is a flowchart showing the sequence of selection of noise processing methods according to the first embodiment.

FIG. 3 is a flowchart showing the sequence of selection of noise processing methods according to the first embodiment. In this embodiment, the following description will be given using the diaphragm driving unit 9c as an example of the optical system driving unit 9 for the sake of simplicity. The diaphragm driving unit 9c of this embodiment uses a stepping motor arranged in the imaging lens 2 as a driving source. As described above, the camera system control circuit 25 executes the adjustment operation of the optical system as needed. At this time, the camera system control circuit 25 selects an appropriate driving method, and also a corresponding noise processing method according to the flowchart shown in FIG. 3.

In step S101, the camera system control circuit 25 starts selection of a driving method and noise processing method. The camera system control circuit 25 judges in step S102 whether or not the diaphragm driving unit 9c of the mounted imaging lens 2 is capable of micro-step driving. Information indicating whether or not the diaphragm driving unit 9c is capable of micro-step driving is acquired when the image pickup apparatus 1 communicates with the imaging lens 2 via the electric contacts 10 at an appropriate timing after the imaging lens 2 is mounted on the image pickup apparatus 1. If the mounted imaging lens 2 is capable of micro-step driving, the process advances to step S103; otherwise, the process advances to step S105.

In step S103, the camera system control circuit 25 judges a driving speed of the diaphragm driving unit 9c according to user's settings. For example, in a scene in which an object moves at high speed from shade to a sunny place at a moving image pickup timing, a luminance level of the object changes largely. In such a case, it is desirable to drive the diaphragm at high speed. On the other hand, when the user wishes to execute an image pickup operation while suppressing a change in the depth of field, it is desirable to drive the diaphragm at low speed. These speeds are judged based on user's settings of a mode and the like. In step S103, the camera system control circuit 25 judges the driving speed of the diaphragm driving unit 9c with reference to image pickup settings.

If it is judged in step S102 that the diaphragm driving unit 9c is not capable of micro-step driving, or if high-speed driving is selected in step S103, the process advances to step S105. In step S105, the camera system control circuit 25 selects a full-step driving mode as a driving method of the diaphragm driving unit 9c. In step S107, the camera system control circuit 25 selects prediction processing (to be described in detail later) as a noise processing method. This is because the noise processing based on the prediction processing is particularly effective for noise as short as, for example, 0.5 sec. The camera system control circuit 25 controls the audio processing circuit 26 to execute the selected noise processing.

If low-speed driving is selected in step S103, the process advances to step S109, the camera system control circuit 25 selects a microstep driving mode as the driving method of the diaphragm driving unit 9c. In step S111, the camera system control circuit 25 selects filter processing (to be described in detail later) as a noise processing method. This is because the noise processing based on the prediction processing is particularly effective for noise as short as, for example, 0.5 sec, but is not so effective for noise longer than the short noise. Also, in case of noise generated by microstep driving, a tone volume of the noise is small. Hence, when a frequency of the generated noise is reduced using, for example, a low-pass filter or the like, the noise can be sufficiently reduced. The camera system control circuit 25 controls the audio processing circuit 26 to execute the selected noise processing.

Meanwhile, in the flowchart shown in FIG. 3, when an operation period of the diaphragm driving unit 9c as a noise generation source is long (equal to or larger than a threshold) (i.e., when the diaphragm driving unit 9c is driven by the microstep driving mode), the filter processing is selected. When the operation period is short (less than the threshold) (i.e., when the diaphragm driving unit 9c is driven in the full-step driving mode), the prediction processing is selected. However, as will be described in detail later in the second embodiment, even when the operation period is short, the filter processing may be selected depending on a type of a component which generates noise. Therefore, the selection processing of the noise processing methods in FIG. 3 is executed in consideration of the fact that a component which generates noise is the diaphragm driving unit 9c. In other words, the noise processing method is selected based on the type of a component which generates noise when it is operated, and a length of the operation period.

Next, details of the driving methods of the diaphragm driving unit 9c will be described below with reference to FIGS. 4A and 4B. FIGS. 4A and 4B are charts for explaining excitation methods of a stepping motor. In FIGS. 4A and 4B, the horizontal axis plots a time, and the vertical axis plots a voltage.

FIG. 4A shows the excitation method of so-called full-step driving, and FIG. 4B shows that of so-called microstep driving. In either driving method, voltages of A and B phases have a 90° phase difference in excitation waveforms of the stepping motor. A direction of rotation is decided depending on which of the A and B phases leads. In the full-step driving mode shown in FIG. 4A, voltages of the A and B phases change to reciprocate between two voltage states. In the full-step driving mode, an amount of rotation when the voltage of the A or B phase is switched is a driving amount of so-called one step. A rotation angle by driving of one step varies depending on the structure of a stepping motor. As a feature of the full-step driving mode, a driving torque is large since voltages are simultaneously applied to two coils. For this reason, even when a rotational speed is increased, so-called stepping-out hardly occurs.

In the microstep driving mode shown in FIG. 4B, voltages of the A and B phases change step by step to have some states between full-step driving voltages. As a feature of the microstep driving mode, driving is allowed by dividing one step into some intervals. For this reason, the microstep driving mode is suited to precise position alignment.

As can be seen from the above description using FIGS. 4A and 4B, the full-step driving mode is suited to large movements at high speed, and the microstep driving mode is suited to fine movements at low speed. In the image pickup apparatus 1, an appropriate driving method is selected in correspondence with an image pickup scene, as described above with reference to FIG. 3.

Figure 5:
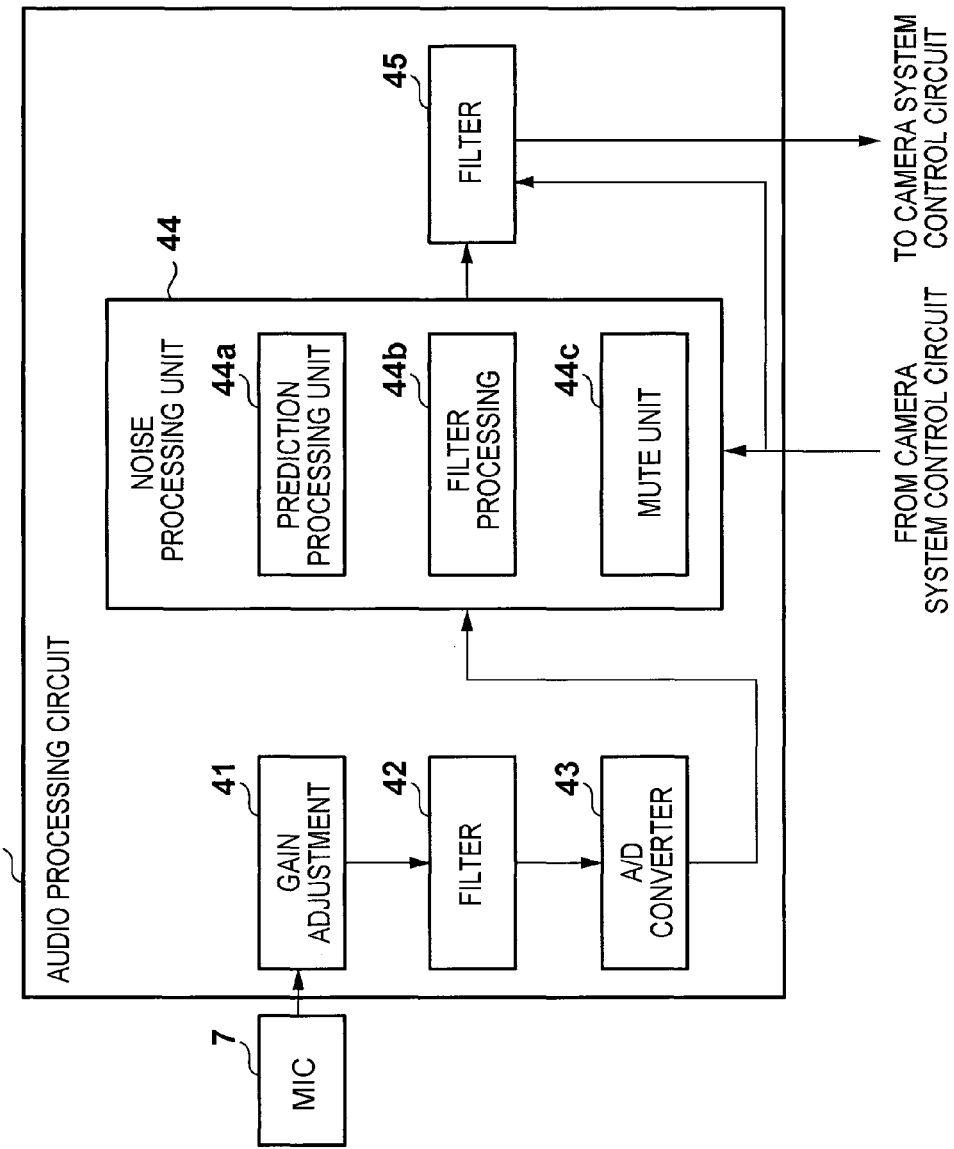
FIG. 5 is a block diagram showing the detailed arrangement of an audio processing circuit 26.

Next, the detailed arrangement of the audio processing circuit 26 will be described below with reference to FIG. 5. Referring to FIG. 5, reference numeral 41 denotes a gain adjustment unit; 42, a filter; 43, an A/D converter; 44, a noise processing unit; and 45, a filter.

A signal obtained by the microphone 7 is supplied to the gain adjustment unit 41. The gain adjustment unit 41 adjusts a signal level of the microphone 7 so as to fully utilize the dynamic range of the A/D converter 43. That is, when the signal level of the microphone 7 is small, the gain adjustment unit 41 rises a gain to amplify the signal; when the signal level of the microphone 7 is large, it lowers a gain to prevent saturation. The filter 42 is configured by a low-pass filter having an appropriate cutoff frequency or the like, in consideration of a sampling frequency of the A/D converter 43. When the microphone 7 is located in the vicinity of an element which generates noise of a specific frequency, the filter 42 may often includes an appropriate notch filter in addition to the aforementioned low-pass filter. The A/D converter 43 converts a signal, which is processed by the gain adjustment unit 41 and filter 42, into a digital signal.

The noise processing unit 44 is configured by a plurality of noise processing units. In the example of FIG. 5, the noise processing unit 44 includes a prediction processing unit 44a, filter processing unit 44b, and MUTE processing unit 44c. The operation of the noise processing unit 44 is controlled by the camera system control circuit 25. The noise processing unit 44 can execute a plurality of noise processes selectively or in combination in accordance with an instruction from the camera system control circuit 25. The filter 45 is required to apply appropriate filter processing if it is required after an audio signal undergoes the noise processing. The filter processing in the filter 45 may be omitted if it is not required.

In FIG. 5, a term "noise processing" is used. The "noise processing" in this case refers to reduction processing of the aforementioned mechanical driving noise (or operation noise generated by an operation of a capacitor or the like) but it does not refer to that of white noise.

The relationship between the presence/absence of the mechanical driving noise and the operation of the audio processing circuit 26 will be described in detail below. When no mechanical driving noise is present, the noise processing unit 44 is set to skip all noise processes, and an audio signal passes through the noise processing unit 44. Also, the filter 45 is similarly disabled. At this time, an audio signal itself converted by the A/D converter 43 is output to the camera system control circuit 25 as an audio signal to be recorded. A processing method when the mechanical driving noise is present will be described later.

Figure 6A:
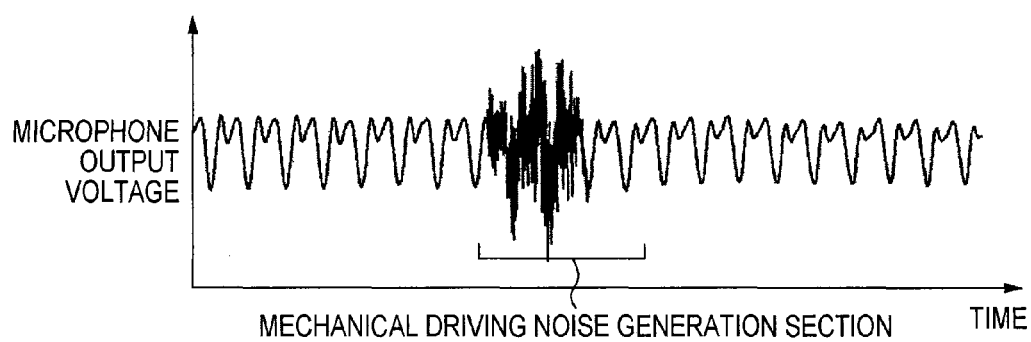
FIGS. 6A and 6B are graphs for explaining a relationship between driving methods of a diaphragm driving unit 9c and acquired audio signals.
Figure 6B:
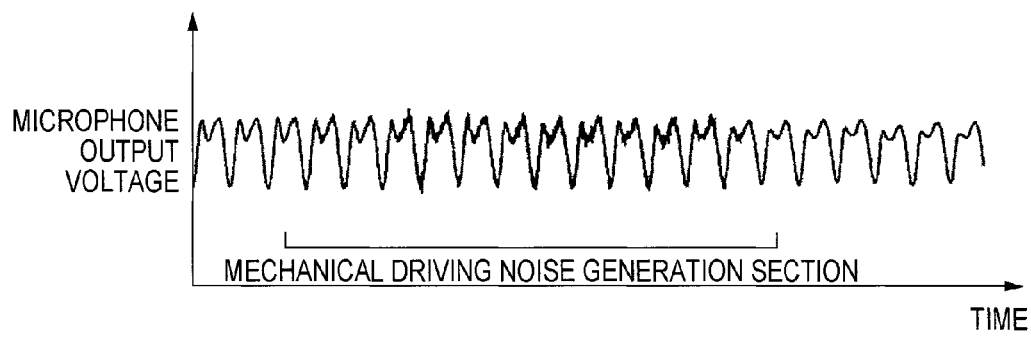

FIGS. 6A and 6B are graphs for explaining the relationship between the driving methods of the diaphragm driving unit 9c and acquired audio signals. In FIGS. 6A and 6B, the horizontal axis plots a time, and the vertical axis plots an output voltage of the microphone 7. FIGS. 6A and 6B exemplify a case in which when an audio signal as object sound is input, the diaphragm driving unit 9c is operated. FIG. 6A shows a case in which the diaphragm driving unit 9c is driven in the full-step driving mode, and FIG. 6B shows a case in which the diaphragm driving unit 9c is driven in the microstep driving mode. As can be seen from comparison between FIGS. 6A and 6B, in the full-step driving mode, a time period in which the mechanical driving noise influences the object sound is short, but the influence of the mechanical driving noise per unit time is large. On the other hand, in the microstep driving mode, a time period in which the mechanical driving noise influences the object sound is long, but the influence of the mechanical driving noise per unit time is small.

Figure 7A:
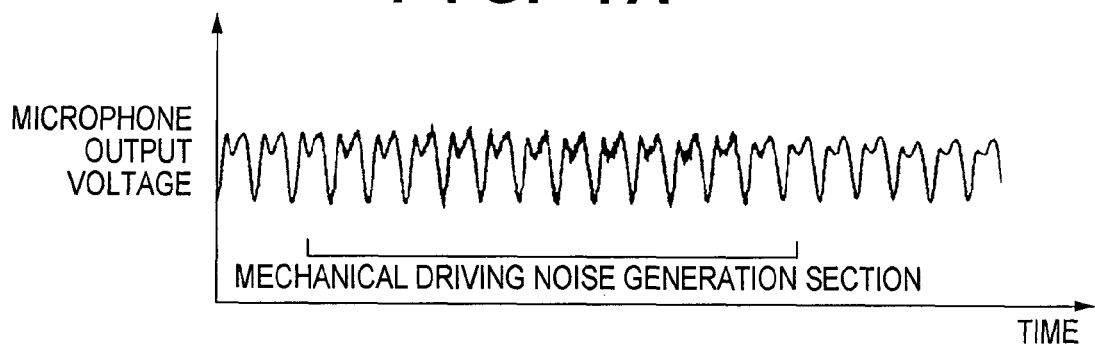
FIGS. 7A to 7D are graphs for explaining details of filter processing.
Figure 7B:
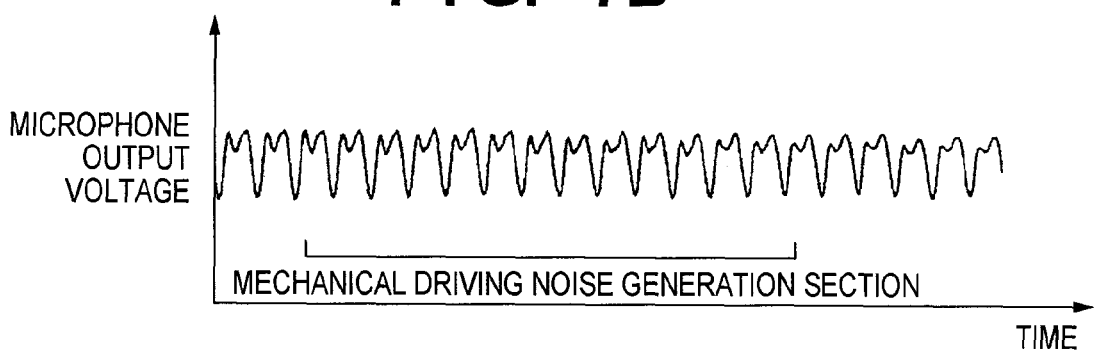
Figure 7C:
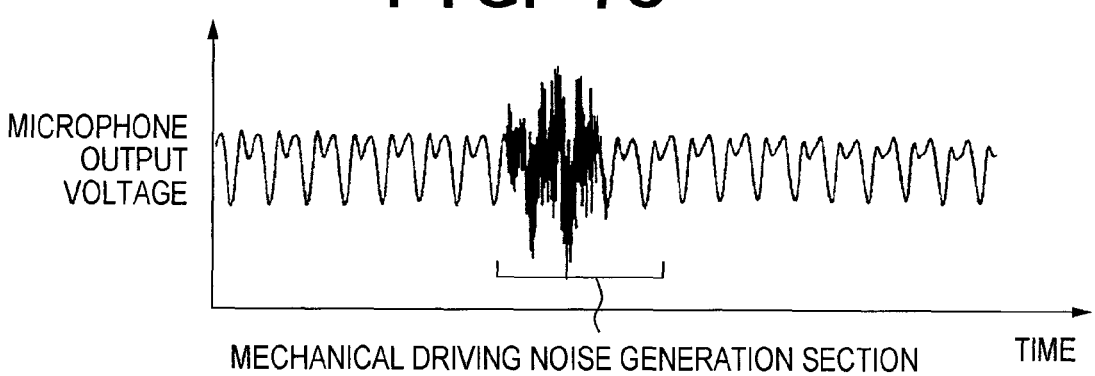
Figure 7D:
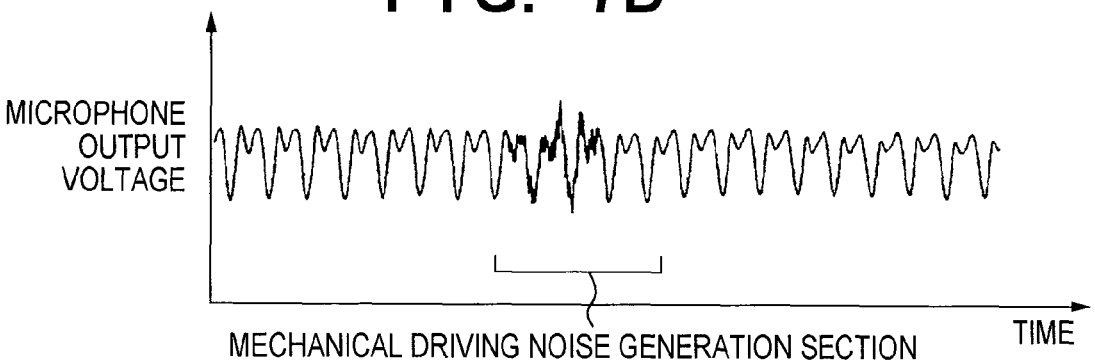

Details of the filter processing will be described below with reference to FIGS. 7A to 7D. In FIGS. 7A to 7D, the horizontal axis plots a time, and the vertical axis plots an output voltage of the microphone 7. FIG. 7A shows an audio signal acquired when the diaphragm driving unit 9c is driven in the microstep driving mode, and FIG. 7B shows an audio signal obtained by processing the audio signal shown in FIG. 7A using a low-pass filter. FIG. 7C shows an audio signal acquired when the diaphragm driving unit 9c is driven in the full-step driving mode, and FIG. 7D shows an audio signal obtained by processing the audio signal shown in FIG. 7C using a low-pass filter. Note that the low-pass filter is taken as an example of a filter. However, any other filters may be used as long as they can reduce a signal of a frequency corresponding to noise generated by a component such as the diaphragm driving unit 9c when it is operated.

In the microstep driving mode, since the generated mechanical driving noise is small, the influence of the mechanical driving noise is sufficiently reduced in the audio signal in FIG. 7B, which is obtained by applying the low-pass filter processing to the audio signal in FIG. 7A, and high-quality object sound can be obtained. On the other hand, in the full-step driving mode, since the mechanical driving noise is large, many components of the mechanical driving noise still remain in the audio signal in FIG. 7D, which is obtained by applying the low-pass filter processing to the audio signal in FIG. 7C. Even when multiple-application processing of the low-pass filter is executed, since the mechanical driving noise includes a signal of the same frequency band as the object sound, it is not easy to obtain high-quality object sound.

As described above using FIGS. 7A to 7D, high-quality object sound can be obtained by applying appropriate filter processing depending on the driving method of the optical system driving unit 9. On the other hand, there is a driving method with which high-quality object sound cannot be obtained by applying the filter processing.

Figure 8A:
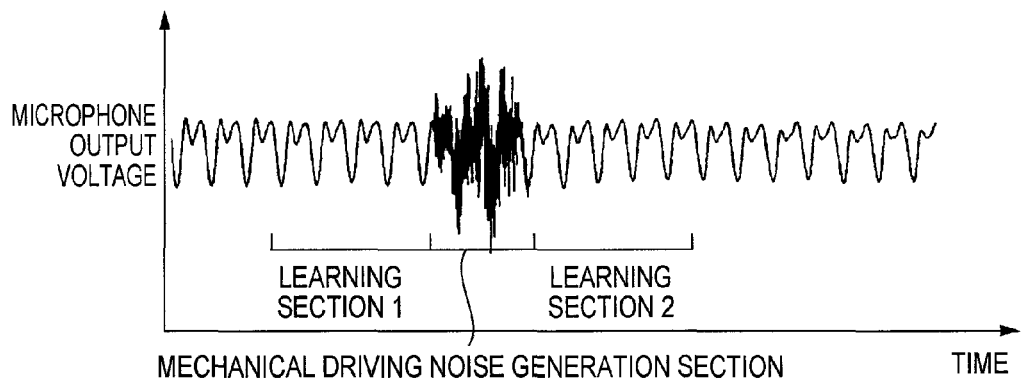
FIGS. 8A to 8C are graphs for explaining details of prediction processing.
Figure 8B:
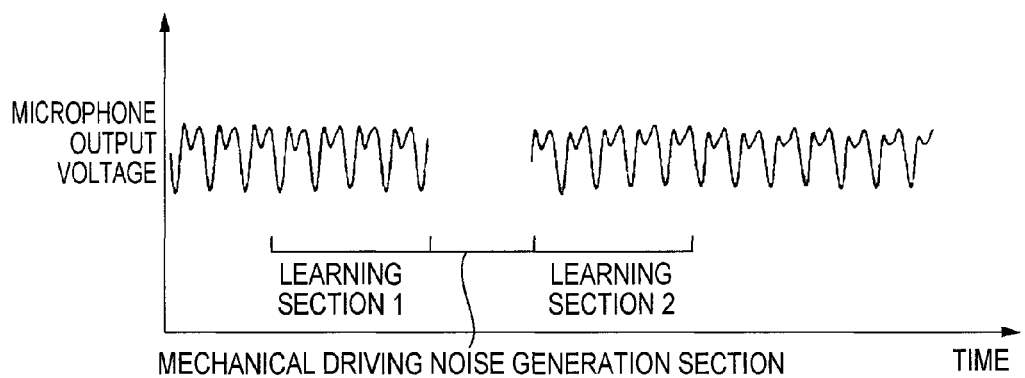
Figure 8C:
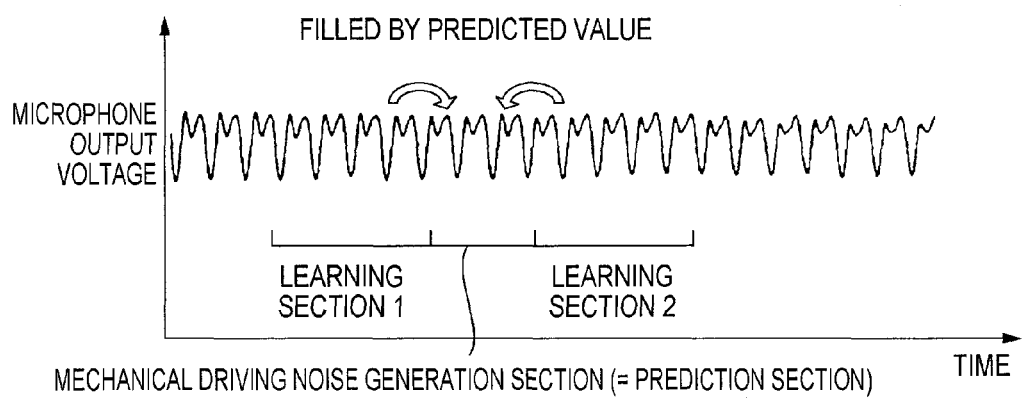

Next, details of the prediction processing will be described below with reference to FIGS. 8A to 8C. In FIGS. 8A to 8C, the horizontal axis plots a time, and the vertical axis plots an output voltage of the microphone 7. FIG. 8A shows an audio signal when the mechanical driving noise is present, and the object sound is relatively small, FIG. 8B shows an intermediate stage of the prediction processing of the audio signal shown in FIG. 8A, and FIG. 8C shows an audio signal after the prediction processing of the audio signal shown in FIG. 8A.

In this embodiment, the audio processing circuit 26 executes the noise processing using the prediction processing for a section including the mechanical driving noise when the diaphragm driving unit 9c is driven in the full-step driving mode. In the prediction processing, the prediction processing unit 44a discards signals of a section including the mechanical driving noise, as shown in FIG. 8B. Next, the prediction processing unit 44a executes a learning operation and prediction operation, as will be described later, and fills the signals of the section (prediction section) including the mechanical driving noise with signals calculated by the prediction operation (see FIG. 8C).

In this manner, the prediction processing has a feature that original signals in the prediction section are discarded, and signals are generated based on those in learning sections before and after the prediction section. Hence, the prediction processing has a feature that the magnitude of the mechanical driving noise in the prediction section is not matter compared to the filter processing, and performance is better as the prediction section is shorter. For this reason, as described in this embodiment, the prediction processing is effective when it is combined with the driving method such as the full-step driving mode.

Derivation (learning operation) of linear prediction coefficients and prediction (prediction operation) of signals using the linear prediction coefficients, which are used in the prediction processing of this embodiment, will be described below. Upon using linear prediction, the following linear first-order combination relationship between the current signal and the finite number (p in this case) of sample values which neighbor that signal is assumed.

$$x_t + \alpha_1 x_{t-1} + \ldots \alpha_p x_{t-p} = \epsilon_t \quad (1)$$

where $\epsilon_t$ are mutually noncorrelated random variables of an average value=0 and variance=$\sigma^2$. This equation is modified as follows, so as to allow $x_t$ to be predicted from previous values.

$$x_t = \hat{x}_t + \epsilon_t = -\alpha_1 x_{t-1} - \cdots - \alpha_p x_{t-p} + \epsilon_t = -\sum_{i=1}^{p} \alpha_i x_{t-i} + \epsilon_t \quad (2)$$

According to equation (2), if $\epsilon_t$ is sufficiently small, the current value is expressed by a linear sum of p neighboring values. After $x_t$ is calculated by the above prediction, if its approximation is sufficiently good, $x_{t+1}$ is similarly calculated by a linear sum of p neighboring values. In this way, if $\epsilon_t$ can be set to be sufficiently small, signals can be calculated by predicting values in turn. Hence, a calculation method of $\alpha_i$, which minimizes $\epsilon_t$, will be examined. In the present invention, an operation for calculating $\alpha_i$, which minimizes $\epsilon_t$, is called a learning operation.

In each learning section described above, a square sum of $\epsilon_t$ need only be minimized. Letting $t_0$ be a start time of learning, and $t_1$ be an end time, we have:

$$\sum_{t=t_0}^{t_1} \epsilon_t^2 = \sum_{t=t_0}^{t_1} \left( \sum_{i=0}^{p} \alpha_i x_{t-i} \right)^2 = \sum_{t=t_0}^{t_1} \sum_{i=0}^{p} \sum_{j=0}^{p} \alpha_i \alpha_j x_{t-i} x_{t-j} \quad (3)$$

where $\alpha_0 = 1$. To simplify the equation, we have:

$$c_{ij} = \sum_{t=t_0}^{t_1} x_{t-i} x_{t-j} \quad (4)$$

In order to decide $\alpha_i$ so as to minimize equation (3), equation (3) can be solved while setting a partial differential associated with $\alpha_j$ (j=1, 2, ..., p) of equation (3) to be zero.

$$\frac{\partial}{\partial \alpha_i} \sum_{t=t_0}^{t_1} \epsilon_t^2 = \frac{\partial}{\partial \alpha_i} \left( \sum_{i=0}^{p} \sum_{j=0}^{p} \alpha_i c_{ij} \alpha_j \right) = 2 \sum_{i=0}^{p} \alpha_i c_{ij} = 0 \quad (5)$$

Equation (5) demonstrates that $\alpha_i$ can be decided by solving p simultaneous first-order linear equations. Of equation (5), $c_{ij}$ can be calculated from $x_{t-1}$ (i=1, 2, ..., p). That is, $\alpha_i$ can be calculated from equation (5).

When $\alpha_i$ is decided according to equation (5), a square sum of $\epsilon_t$ has been minimized. At this time, from equation (2), a good approximation of a value of $x_t$ can be obtained by $\hat{x}_t$. If this approximation is sufficiently good, $\hat{x}_t$ can be used as a prediction signal in place of $x_t$. Furthermore, as for $x_{t+1}$, an approximate value can be similarly obtained from signals calculated using p-1 neighboring values and prediction. By repeating this, signals of the prediction section can be generated. In the present invention, an operation for calculating an approximation of the prediction section from the calculated $\alpha_i$ is called a prediction operation.

An example of the learning operation and prediction operation will be described in detail below. As shown in FIGS. 8A to 8C, upon execution of the learning operation, neighboring signals before and after the prediction section are used. This uses a nature of an audio signal, that is, relatively high repeatability while focusing attention on a very short time domain. As shown in FIGS. 8A to 8C, a learning section 1 is set in a time period before the section including the mechanical driving noise, and a learning section 2 is set in a time period after the section including the mechanical driving noise. In the learning operation and prediction operation, calculations are independently made for signals in the learning sections 1 and 2. Generation of signals in the prediction section after the learning operation in the learning section 1 will be referred to as forward prediction, and generation of signals in the prediction section after the learning operation in the learning section 2 will be referred to as backward prediction. Signals of the prediction section can be calculated by appropriate calculations, so as to set larger weights for values obtained by the forward prediction when they are closer to the learning section 1, and to set larger weights for values obtained by the backward prediction when they are closer to the learning section 2.

The learning sections need not always be set both before and after the prediction section. In other words, the prediction processing unit 44a may set at least one of periods before and after a prediction section (an operation period of a component which generates noise when it is operated) as a learning section, and may replace audio signals in the prediction section by those which are generated based on audio signals in this learning section.

Figure 9A:
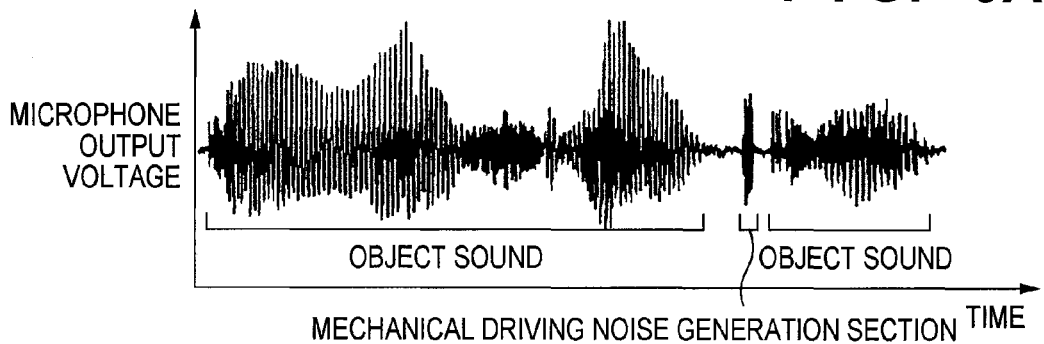
FIGS. 9A to 9D are graphs for explaining details of MUTE processing.
Figure 9B:
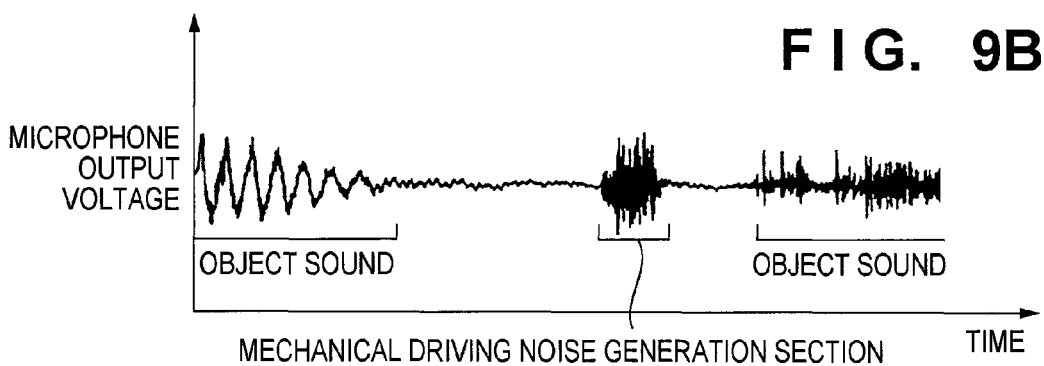
Figure 9C:
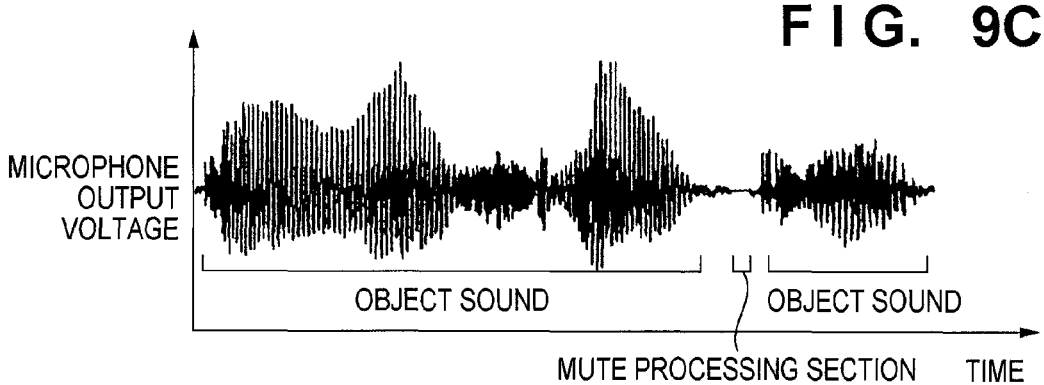
Figure 9D:
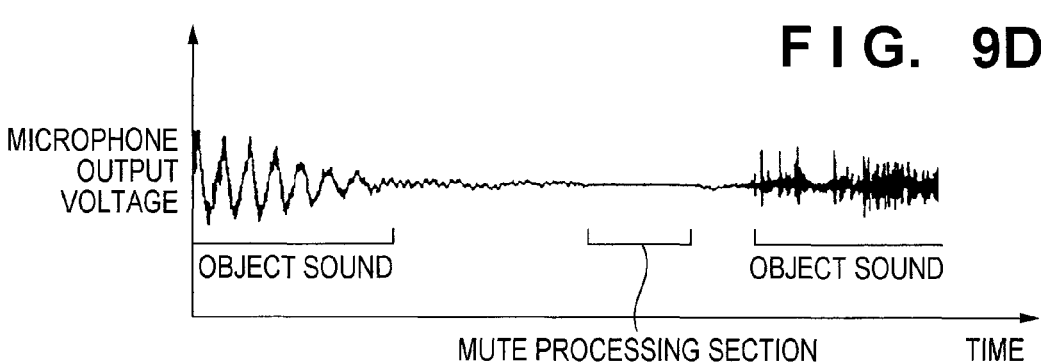

Details of the MUTE processing will be described below with reference to FIGS. 9A to 9D. In FIGS. 9A to 9D, the horizontal axis plots a time, and the vertical axis plots an output voltage of the microphone 7. FIG. 9A shows an audio signal acquired as a combination of the mechanical driving noise and object sound, and FIG. 9B shows an audio signal as an enlarged view of FIG. 9A in the vicinity of the mechanical driving noise. FIG. 9C shows an audio signal after the MUTE processing of the audio signal shown in FIG. 9A, and FIG. 9D shows an audio signal as an enlarged view of FIG. 9C in the vicinity of a section of the MUTE processing.

As shown in FIG. 9A, the mechanical driving noise is not always generated during a time period including the object sound. FIG. 9A exemplifies a case in which the mechanical driving noise is generated after an end position of the object sound. As can be seen from FIG. 9B as an enlarged view of a generation part of the mechanical driving noise, no object sound is generated immediately before and after the mechanical driving noise. Since a generation timing of the mechanical driving noise can be detected from the camera system control circuit 25, the presence/absence of the object sound can be detected by observing powers of signals before and after the generation timing. For example, signals in sections of about 0.1 sec before and after the generation timing of the mechanical driving noise may undergo Fourier transformation to estimate power spectra. If it can be judged that the aforementioned powers are sufficiently small, signals in the mechanical driving noise generation section are processed by the MUTE processing in place of the aforementioned prediction processing. This MUTE processing can reduce a calculation volume compared to the aforementioned prediction processing.

FIG. 9C shows a signal after the MUTE processing. The MUTE processing is applied to minimum required sections to include at least the mechanical driving noise generation section. As shown in FIGS. 9C and 9D, the MUTE processing can be executed without any influence on the object sound. As described above, a high-quality audio signal can be easily obtained by executing the MUTE processing depending on circumstances.

In the MUTE processing described using FIGS. 9A to 9D, since the absence of object sound during the mechanical driving noise generation section is predicted, it is desirable that the section has a shorter time period. That is, the MUTE processing is effective when it is combined with the driving method such as the full-step driving mode as in the aforementioned prediction processing.

As described above, according to this embodiment, when the diaphragm driving unit 9c is driven in the full-step driving mode (i.e., an operation period is short), the audio processing circuit 26 selects the prediction processing (or the MUTE processing in some cases) under the control of the camera system control circuit 25, or when the diaphragm driving unit 9c is driven in the microstep driving mode (i.e., an operation period is long), it selects the filter processing. In this manner, according to this embodiment, the processes for reducing noise included in an audio signal can be selected based on the types of components which generate noise when they operate, as well as the lengths of the operation period.

Second Embodiment

The second embodiment will explain in detail a case in which filter processing is selected depending on a type of a component which generates noise even when an operation period is short. The second embodiment adopts the same arrangement of the image pickup apparatus 1 and the like as those of the first embodiment, unless otherwise specified.

Figure 10A:
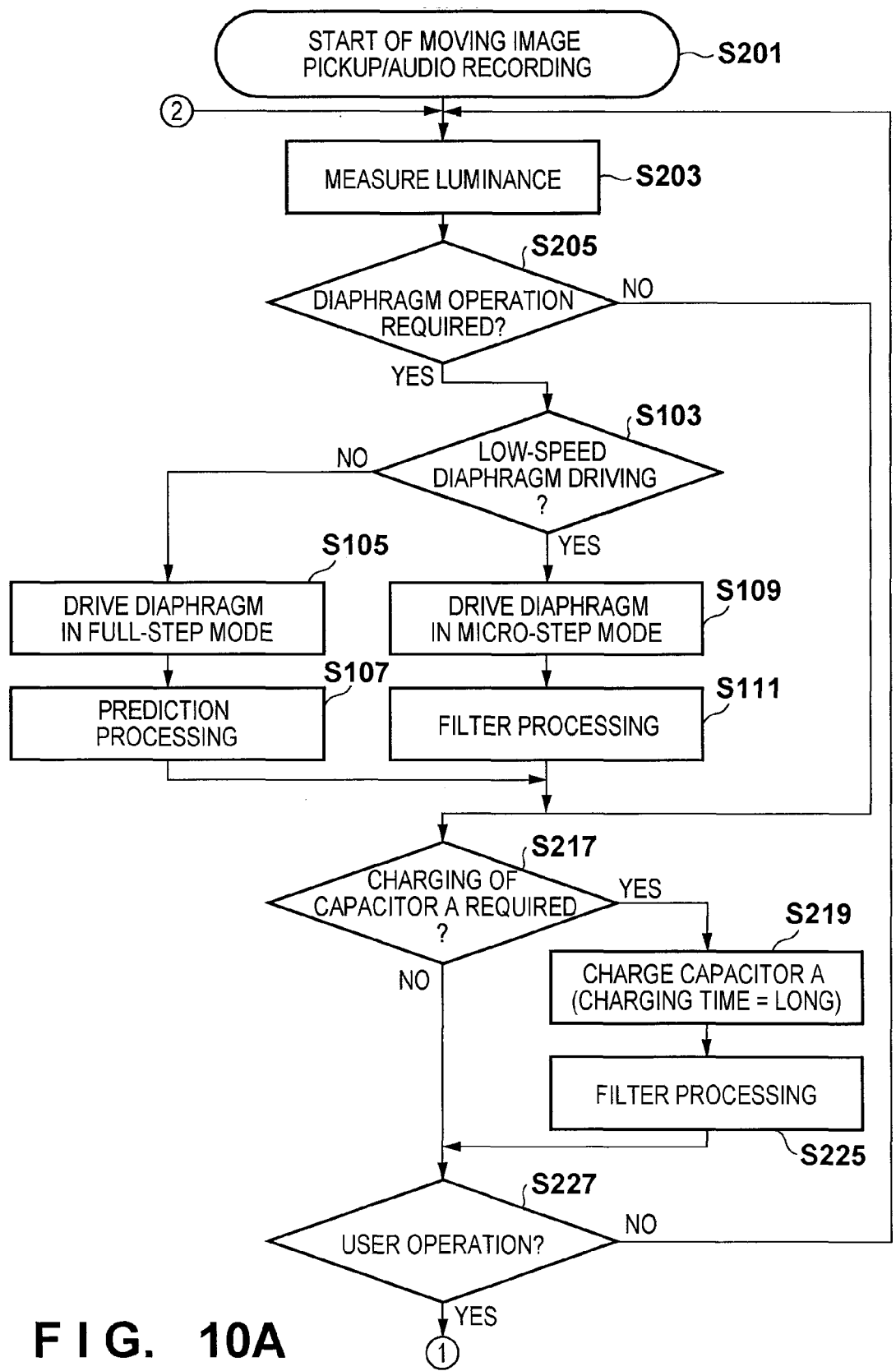
FIGS. 10A and 10B are flowcharts showing the sequence of selection of noise processing methods according to the second embodiment.
Figure 10B:
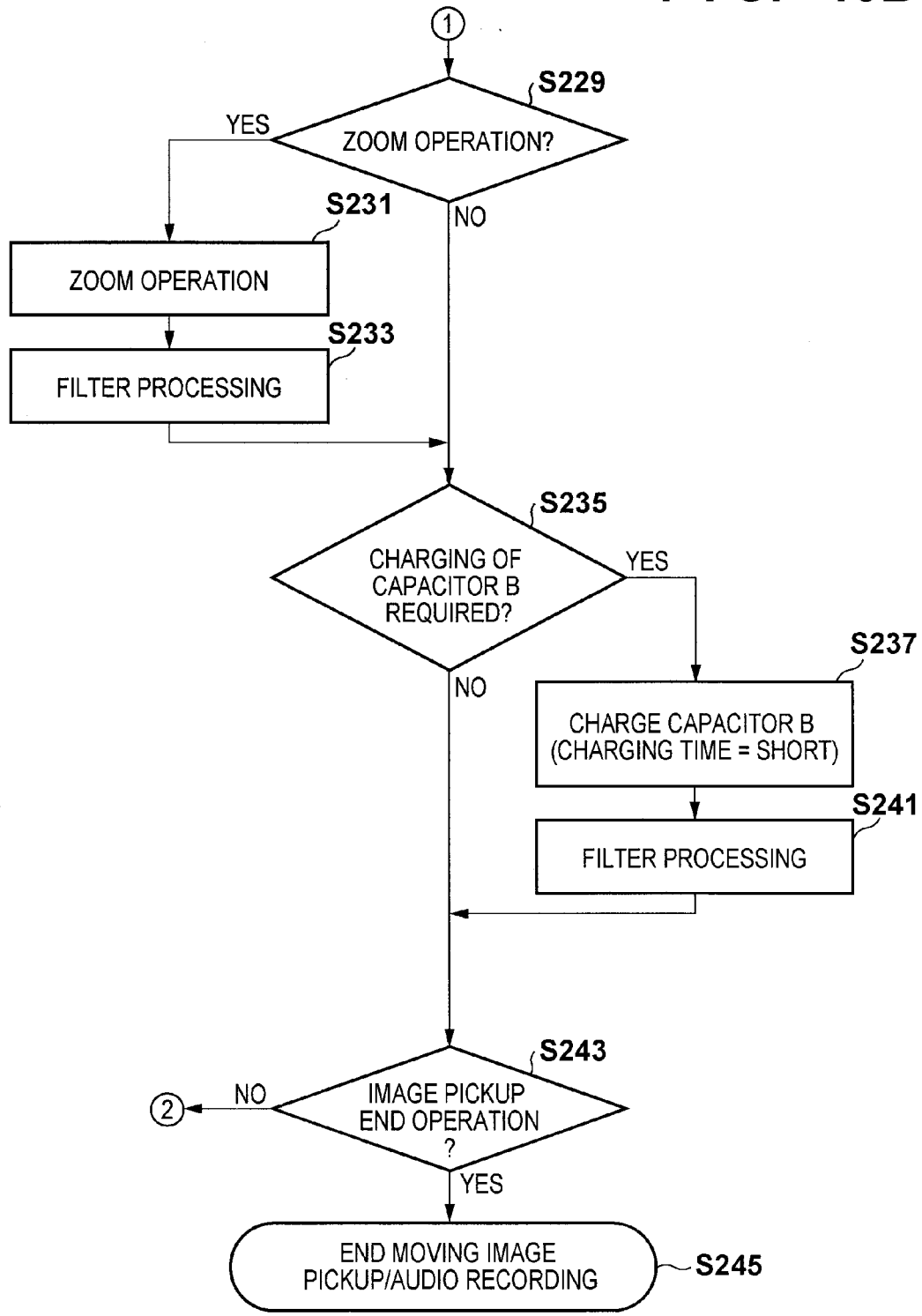

FIGS. 10A and 10B are flowcharts showing the sequence of selection of noise processing methods according to the second embodiment. In FIGS. 10A and 10B, the same step numbers denote steps in which the same processes as in FIG. 3 are executed, and a description thereof will not be repeated.

Upon reception of a moving image pickup/audio recording start instruction via an operation button (not shown), the camera system control circuit 25 starts a moving image pickup operation in step S201.

In step S203, the camera system control circuit 25 measures a luminance level by applying appropriate signal processing to luminance signals on an imaging plane using, for example, the image processing circuit 21. The camera system control circuit 25 judges in step S205 based on the luminance level measured in step S203 whether or not the operation of the diaphragm driving unit 9c is required. When the image pickup element 6 is about to saturate, the diaphragm has to be driven to its minimum aperture side, or when the luminance level is too low to lower an S/N ratio of the image pickup element 6, it has to be driven to its open aperture side. If it is judged that the diaphragm operation is required, the process advances to step S103; otherwise, the process advances to step S217.

The processes in steps S103 to S111 are the same as those in the first embodiment. These processes will be briefly described below. That is, in the diaphragm driving operation, when an operation period is shorter than a predetermined time period (for example, 0.5 sec) (in case of the full-step driving mode), the aforementioned prediction processing is executed to attain the noise processing. On the other hand, when an operation period is longer than the predetermined time period (for example, 0.5 sec) (in case of the microstep driving mode), the aforementioned filter processing is executed to attain the noise processing.

The camera system control circuit 25 confirms in step S217 whether or not execution of a charging operation of a capacitor A (not shown) required for moving image pickup processing is required. If the charging operation is required, the process advances to step S219, and the camera system control circuit 25 executes the charging operation of the capacitor A. The charging operation of the capacitor A requires about 3 sec to 4 sec, and noise of a predetermined frequency (for example, 10 kHz) is generated during that interval. For this reason, when the capacitor A is charged during the moving image pickup operation, the camera system control circuit 25 reduces an audio signal of 10 kHz using a notch filter in step S225. In this connection, noise of this type is that of a resonance frequency by the capacitor A and a coil in a circuit. The camera system control circuit 25 controls the audio processing circuit 26 to execute the selected noise processing.

In step S227, the camera system control circuit 25 judges the presence/absence of a user operation. If the user does not make any operation, the process returns to step S203 to repeat the aforementioned operations. If the user makes an arbitrary operation, the process advances to step S229.

The camera system control circuit 25 judges in step S229 whether or not the user makes a zoom operation. If the user makes the zoom operation, the process advances to step S231, and the camera system control circuit 25 executes the zoom operation. Then, in step S233, the camera system control circuit 25 selects the filter processing as the noise processing. The camera system control circuit 25 controls the audio processing circuit 26 to execute the selected noise processing.

The camera system control circuit 25 confirms in step S235 whether or not execution of a charging operation of a capacitor B (not shown) is required. The charging operation of the capacitor B is required when charged electric charges are temporarily discharged after re-display of a monitor, flash emission for a still image, or the like in response to a user instruction. If the charging operation is required, the camera system control circuit 25 executes the charging operation of the capacitor B in step S237. The charging operation of the capacitor B requires about 0.2 sec to 0.5 sec, and noise of a frequency (for example, 10 kHz or 12 kHz), which is the same as or different from that generated by the capacitor A, is generated during that interval. For this reason, in step S241, the camera system control circuit 25 selects filter processing to reduce an audio signal of 10 kHz or 12 kHz using a notch filter. The camera system control circuit 25 controls the audio processing circuit 26 to execute the selected noise processing.

The camera system control circuit 25 judges in step S243 if the user makes an image pickup end operation. If the user makes the image pickup end operation, the process advances to step S245, and the camera system control circuit 25 ends the moving image pickup/audio recording operation. Otherwise, the process returns to step S203 to repeat the aforementioned operations.

As can be understood from steps S237 and S241 in FIG. 10B, the image pickup apparatus 1 of this embodiment executes the filter processing for noise caused by the charging operation of the capacitor even when an operation period is short, unlike in the case of the diaphragm driving unit 9c. This is because noise caused by the operation of the capacitor (second component) has a nature suited to reduction by the filter processing compared to that caused by the operation of the diaphragm driving unit 9c (first component). A calculation load of the prediction processing is heavier than that of the filter processing. In this case, by executing the filter processing for a component such as the capacitor even when an operation period is short, the calculation load of the image pickup apparatus 1 can be reduced. Furthermore, unlike in the prediction processing, object sound during a noise generation period can be left to some extent.

As described above, according to this embodiment, when the diaphragm driving unit 9c is driven in the full-step driving mode (i.e., an operation period is short), the camera system control circuit 25 selects the prediction processing (or the MUTE processing in some cases), or when the diaphragm driving unit 9c is driven in the microstep driving mode (i.e., an operation period is long), it selects the filter processing. On the other hand, in case of the charging operation of the capacitor, the camera system control circuit 25 selects the filter processing irrespective of the length of the operation period. In this manner, according to this embodiment, the processes for reducing noise included in an audio signal can be selected based on the types of components which generate noise when they operate, as well as the lengths of the operation period.

Note that in this embodiment, the capacitors A and B have been described as independent capacitors. However, the present invention is applicable to a case in which charging operations that require different time periods are executed for a single capacitor.

Moreover, although the filter processing is always executed in case of the zoom operation (see steps S231 and S233), alternatively, when a noise generation time period is short, the prediction processing may be executed, and when it is long, the filter processing may be executed. Furthermore, for the focusing lens driving unit 9a, the filter processing may be executed irrespective of the length of the noise generation time period. For example, in case of a component which generates noise having a nature suited to reduction by the filter processing, when the filter processing is executed irrespective of the length of an operation period, noise can be effectively reduced without so impairing object sound. Even when an operation period of such component is short, the filter processing is selected in place of the prediction processing, thus reducing a calculation load on the image pickup apparatus 1.

(Modification)

In the aforementioned embodiments, the image pickup apparatus 1 executes the noise processing in a moving image pickup operation. However, the image pickup apparatus 1 may be configured to record an audio signal without any noise processing in the moving image pickup operation, and to execute the noise processing later. More specifically, for example, the image pickup apparatus 1 records an audio signal together with types of components, which generate noise, and their operation timings. Then, for example, when the audio signal is played back, the image pickup apparatus 1 executes the noise processing described above with reference to FIGS. 10A and 10B based on the recorded types of components and their operation timings. In this case, the flowcharts shown in FIGS. 10A and 10B may be modified as needed (for example, step S217 is read as "operation timing of capacitor A?, and step S219 is omitted). In place of the image pickup apparatus 1 itself, a PC or the like, which acquires an audio signal from the image pickup apparatus 1 together with the types of components and operation timings upon acquisition of the audio signal, may execute the noise processing. In this case, the image pickup apparatus 1 serves as an audio signal acquisition apparatus, and the PC serves as an audio signal processing apparatus.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments The scope of the following claims is to be accorded the broadest interpretation so as to encompass all such modifications and equivalent structures and functions.

This application claims the benefit of Japanese Patent Application No. 2011-064825, filed on Mar. 23, 2011, which is hereby incorporated by reference herein in its entirety.

What is claimed is:

1. An audio signal processing apparatus comprising:
a connection unit that connects with a removable lens unit;
a microphone unit that acquires audio signal;
an audio processor that processes the audio signal acquired by the microphone unit so as to reduce a driving noise of the removable lens unit; and
a controller,
wherein the audio processor performs a first reduction process and a second reduction process,
wherein the audio processor, in the first reduction process, reduces the driving noise by using a signal which is generated based on an audio signal of previous or subsequent to a noise section of the driving noise,
wherein the audio processor, in the second reduction process, reduces the driving noise by attenuating a part of the driving noise,
wherein the controller detects a type of the connected removable lens unit,
wherein the controller controls the audio processor to perform the first reduction process, in a case where the type of the connected removable lens unit is a first type lens unit, and
wherein the controller controls the audio processor to perform the second reduction process, in a case where the type of the connected removable lens unit is a second type lens unit.

2. The audio signal processing apparatus according to claim 1, wherein the controller controls the audio processor to perform the first reduction process or the second reduction process, based on a driving manner of the connected removable lens unit.

3. The audio signal processing apparatus according to claim 2, wherein the controller controls the driving manner of the connected removable lens unit.

4. The audio signal processing apparatus according to claim 1, wherein the first type lens unit is a lens unit which does not drive a driving member of the lens unit by micro-step driving.

5. The audio signal processing apparatus according to claim 1, wherein the second type lens unit is a lens unit which drives a driving member of the lens unit by micro-step driving.

6. The audio signal processing apparatus according to claim 5, wherein the controller controls the audio processor to perform the first reduction process or the second reduction process, based on a driving speed of the driving member.

7. The audio signal processing apparatus according to claim 6, further comprising:
a image pickup unit that picks up an image obtained by the connected removable lens unit,
wherein the controller controls the driving speed of the driving member based on an image pickup setting.

8. The audio signal processing apparatus according to claim 1, wherein the audio processor, in the first reduction process, replaces the audio signal of the noise section of the driving noise with the signal which is generated based on the audio signal of previous or subsequent to the noise section of the driving noise.

9. The audio signal processing apparatus according to claim 1, wherein the audio processor, in the second reduction process, mutes the audio signal of the noise section of the driving noise.

10. The audio signal processing apparatus according to claim 1, wherein the audio processor, in the second reduction process, reduces the audio signal, of the specific frequency, of the noise section of the driving noise.

* * * * *